(12) United States Patent
Yoon et al.

(10) Patent No.: US 12,089,148 B2
(45) Date of Patent: Sep. 10, 2024

(54) ELECTRONIC DEVICE FOR SEARCHING A NODE BASED ON IDENTIFICATION INFORMATION OF CELLULAR COMMUNICATION NETWORK AND METHOD FOR THE SAME

(71) Applicant: Samsung Electronics Co., Ltd., Suwon-si (KR)

(72) Inventors: Soyoung Yoon, Suwon-si (KR); Yonghyon Kim, Suwon-si (KR); Minseok Shin, Suwon-si (KR); Songkyu Kim, Suwon-si (KR); Jungmin Oh, Suwon-si (KR); Kyungwon Lee, Suwon-si (KR); Sanghyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 17/509,295

(22) Filed: Oct. 25, 2021

(65) Prior Publication Data
US 2022/0159562 A1 May 19, 2022

Related U.S. Application Data

(63) Continuation of application No. PCT/KR2021/014701, filed on Oct. 20, 2021.

(30) Foreign Application Priority Data

Nov. 13, 2020 (KR) .................. 10-2020-0152271
Nov. 26, 2020 (KR) .................. 10-2020-0161621

(51) Int. Cl.
*H04W 48/18* (2009.01)
*H04W 28/02* (2009.01)
(Continued)

(52) U.S. Cl.
CPC ....... *H04W 48/18* (2013.01); *H04W 28/0215* (2013.01); *H04W 48/20* (2013.01); *H04W 72/51* (2023.01); *H04W 76/10* (2018.02)

(58) Field of Classification Search
CPC ..... H04W 60/00; H04W 76/14; H04W 76/20; H04W 36/0061; H04W 48/16;
(Continued)

(56) References Cited

U.S. PATENT DOCUMENTS 8,923,858 B2 * 12/2014 Perets ................... H04W 60/00
                                                        455/434
9,661,635 B2 *  5/2017 Morita .................. H04W 76/20
(Continued)

FOREIGN PATENT DOCUMENTS

CN          111294918 A     6/2020
KR    10-2018-0132157 A    12/2018
(Continued)

OTHER PUBLICATIONS

C. Yang, J. Wang, M. Wang, K. J. Zou, K. W. Yang and M. Hua, "Over-the-air signaling in cellular communication systems," in IEEE Wireless Communications, vol. 21, No. 4, pp. 120-129, Aug. 2014, doi: 10.1109/MWC.2014.6882304. (Year: 2014).*
(Continued)

*Primary Examiner* — William D Cumming
(74) *Attorney, Agent, or Firm* — Jefferson IP Law, LLP

(57) ABSTRACT

An electronic device and operation method are provided that include a communication circuit, a memory to store mapping data in which identification information of a cellular communication network and information indicating whether the cellular communication network supports a standalone (SA) mode of a first cellular communication supported thereby are mapped, and a communication processor to, while searching for a node through the first cellular com-
(Continued)

munication and/or second cellular communication, receive system information broadcast by the node, determine, based on identification information of a cellular communication network included in the system information and the mapping data, whether a cellular communication network corresponding to the node supports the SA mode of the first cellular communication, and, when it is determined that the cellular communication network does not support the SA mode, stop searching for the node through the first cellular communication and search for the node through the second cellular communication.

14 Claims, 12 Drawing Sheets

(51) Int. Cl.
*H04W 48/20* (2009.01)
*H04W 72/51* (2023.01)
*H04W 76/10* (2018.01)

(58) Field of Classification Search
CPC ... H04W 48/18; H04W 8/16; H04W 36/0083; H04W 76/10; H04W 74/0808; H04W 72/569; H04W 28/10; H04W 28/0263
USPC ............... 455/434, 436; 370/208, 321, 311
See application file for complete search history.

(56) References Cited

U.S. PATENT DOCUMENTS

| | | | |
|---|---|---|---|
| 9,713,159 B2* | 7/2017 | Morita | H04W 76/14 |
| 9,900,765 B2 | 2/2018 | Gonzalez et al. | |
| 10,524,166 B2 | 12/2019 | Youn et al. | |
| 10,791,508 B2 | 9/2020 | Park et al. | |
| 10,911,993 B2 | 2/2021 | Pakniat et al. | |
| 10,951,466 B2* | 3/2021 | Zhang | H04W 8/20 |
| 11,171,733 B2 | 11/2021 | Park et al. | |
| 11,196,672 B2* | 12/2021 | Xu | H04W 48/16 |
| 11,317,473 B2 | 4/2022 | Kodali et al. | |
| 11,570,701 B2* | 1/2023 | Wei | H04W 48/16 |
| 11,637,780 B2* | 4/2023 | Xu | H04W 48/16 370/328 |
| 11,641,603 B2* | 5/2023 | Pakniat | H04W 36/0061 455/436 |
| 11,652,562 B2* | 5/2023 | Parkvall | H04L 65/1023 370/208 |
| 11,737,133 B2* | 8/2023 | Chu | H04W 74/0808 370/311 |
| 11,950,124 B2* | 4/2024 | Chen | H04W 28/0263 |
| 2013/0217386 A1* | 8/2013 | Perets | H04W 60/00 455/434 |
| 2015/0319701 A1 | 11/2015 | Ng et al. | |
| 2019/0021064 A1 | 1/2019 | Ryu et al. | |
| 2020/0053616 A1 | 2/2020 | Zhu et al. | |
| 2020/0092198 A1* | 3/2020 | Faccin | H04L 45/243 |
| 2020/0260370 A1 | 8/2020 | Nithiyanantham et al. | |
| 2021/0160186 A1* | 5/2021 | Xu | H04L 47/20 |
| 2021/0168646 A1* | 6/2021 | Chen | H04W 28/10 |
| 2021/0211949 A1* | 7/2021 | Pakniat | H04W 36/0061 |
| 2021/0282077 A1* | 9/2021 | Wei | H04W 48/18 |
| 2021/0352567 A1 | 11/2021 | Kim et al. | |
| 2021/0360646 A1* | 11/2021 | Chu | H04W 72/569 |
| 2022/0070100 A1* | 3/2022 | Xu | H04W 48/16 |
| 2022/0159562 A1* | 5/2022 | Yoon | H04W 76/10 |
| 2023/0224059 A1* | 7/2023 | Parkvall | H04L 5/0053 370/321 |

FOREIGN PATENT DOCUMENTS

| | | | | |
|---|---|---|---|---|
| KR | 10-2019-0020142 A | 2/2019 | | |
| KR | 10-2019-0082897 A | 7/2019 | | |
| KR | 10-2019-0117728 A | 10/2019 | | |
| KR | 10-2020-0015442 A | 2/2020 | | |
| KR | 10-2020-0061406 A | 6/2020 | | |
| WO | 2018/008944 A1 | 1/2018 | | |
| WO | WO-2019072902 A1 * | 4/2019 | ............ | H04W 36/00 |
| WO | 2020/010595 A1 | 1/2020 | | |
| WO | 2020/060203 A1 | 3/2020 | | |
| WO | 2021/207996 A1 | 10/2021 | | |
| WO | 2021/226735 A1 | 11/2021 | | |

OTHER PUBLICATIONS

International Search Report with Written Opinion and English translation dated Jan. 19, 2022; International Appln. No. PCT/KR2021/014701.

* cited by examiner

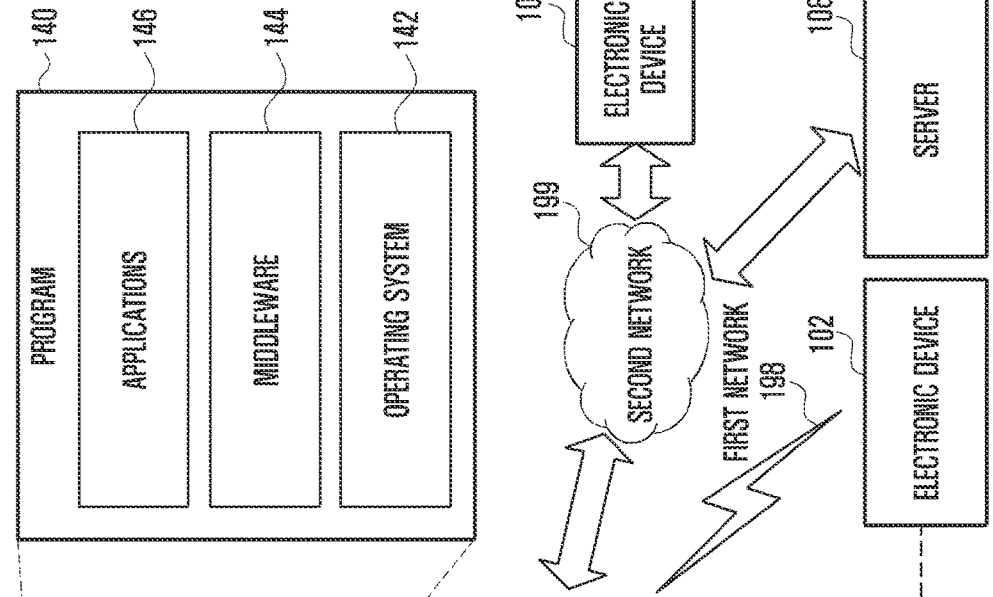
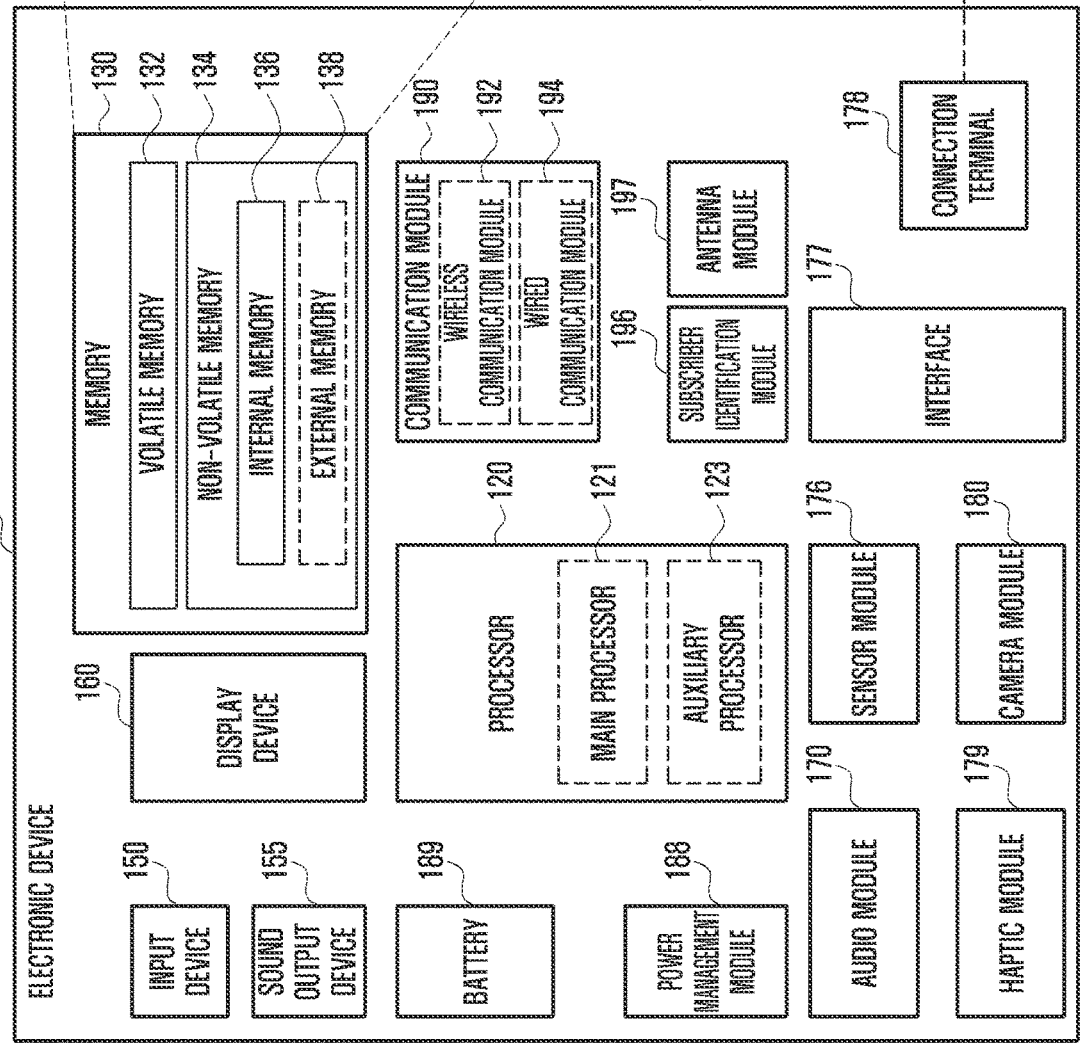
FIG. 1

# ELECTRONIC DEVICE FOR SEARCHING A NODE BASED ON IDENTIFICATION INFORMATION OF CELLULAR COMMUNICATION NETWORK AND METHOD FOR THE SAME

TECHNICAL FIELD

The disclosure relates to an electronic device and a method for operating an electronic device. More particularly, the disclosure relates to a technology for searching for a node based on identification information of a cellular communication network.

BACKGROUND ART

In order to satisfy wireless data traffic demands that have been increasing since commercialization of $4^{th}$ generation (4G) communication systems, there have been ongoing efforts to develop improved $5^{th}$ generation (5G) communication systems or pre-5G communication systems. For this reason, 5G communication systems or pre-5G communication systems are referred to as Beyond 4G Network communication systems or Post long term evolution (LTE) systems. In order to implement high data transmission rates, implementation of 5G communication systems in mmWave bands (for example, bands of 6 Gigahertz (GHz) or higher) other than the bands used in LTE (bands of 6 GHz or lower) is considered. In the 5G communication systems, technologies regarding beamforming, massive multiple-input and multiple-output (MIMO), full dimensional MIMO (FD-MIMO), array antennas, analog beamforming, and large-scale antennas are discussed.

The above information is presented as background information only, and to assist with an understanding of the disclosure. No determination has been made, and no assertion is made, as to whether any of the above might be applicable as prior art with regard to the disclosure.

DISCLOSURE OF INVENTION

Technical Problem

In the case of $5^{th}$-generation cellular communication, data transmission or reception through a higher frequency band than existing $4^{th}$-cellular communication may be supported. The $5^{th}$-generation cellular communication may support a standalone (SA) mode in which standalone connection with a node supporting the $5^{th}$-generation cellular communication is established. The SA mode of the $5^{th}$-generation cellular communication may implement a higher transmission or reception rate than the $4^{th}$-generation cellular communication by using a node supporting data transmission or reception through a relatively high frequency band.

An electronic device configured to support both $5^{th}$-generation cellular communication and $4^{th}$-generation cellular communication may preferentially connect the SA mode of the $5^{th}$-generation cellular communication that has a relatively high data transmission/reception rate over the $4^{th}$-generation cellular communication. The electronic device may preferentially perform a search for a node supporting the SA node over a search for a node supporting the $4^{th}$-generation cellular communication.

An electronic device may have difficulty in identifying whether there is a node supporting the SA mode. In this case, the electronic device may search for a node supporting the SA node even in an environment in which there is no node supporting the SA mode.

If the electronic device searches for a node supporting the SA mode of first cellular communication although the cellular communication network does not support the SA mode of the first cellular communication, the delay time necessary for registration with the cellular communication network may increase.

Aspects of the disclosure are to address at least the above-mentioned problems and/or disadvantages and to provide at least the advantages described below. Accordingly, an aspect of the disclosure is to provide a technology for searching for a node based on identification information of a cellular communication network.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication circuit, a memory configured to store mapping data in which identification information of a cellular communication network and information indicating whether the cellular communication network supports a standalone (SA) mode of a first cellular communication supported thereby are mapped, and a communication processor, wherein the communication processor is configured to, while searching for a node through the first cellular communication and/or second cellular communication, receive system information broadcast by the node, determine, based on identification information of a cellular communication network included in the system information and the mapping data, whether a cellular communication network corresponding to the node supports the SA mode of the first cellular communication, and when it is determined that the cellular communication network does not support the SA mode of the first cellular communication, stop searching for the node through the first cellular communication and search for the node through the second cellular communication.

In accordance with another aspect of the disclosure, an operation method of an electronic device is provided. The electronic device includes receiving, while searching for a node of a cellular communication network, system information broadcast by the node, determining whether a cellular communication network corresponding to the node supports the first cellular communication, based on mapping data in which identification information of the cellular communication network and information indicating whether the cellular communication network supports an SA mode of a first cellular communication supported thereby are mapped and identification information of a cellular communication network included in the system information, and when it is determined that the cellular communication network does not support the SA mode of the first cellular communication, stopping searching for the node through the first cellular communication, and searching for the node through second cellular communication.

Advantageous Effects of Invention

An electronic device and a method for operating an electronic device according to various embodiments of the disclosure may identify whether a cellular communication network supports the SA mode of first cellular communication, based on mapping data in which identification information of the cellular communication network and information indicating whether the cellular communication network supports the SA mode of the first cellular communication are mapped and identification information of the cellular communication network. In response to identifying that the SA mode of the first cellular communication is not supported, the electronic device may stop searching for a node through the first cellular communication and may search for a node through second cellular communication. Therefore, the electronic device and the method for operating the electronic device may not search for a base station supporting the SA mode of first cellular network, on a cellular communication network that does not support the SA mode of the first cellular communication, thereby reducing the delay time necessary for registration with the cellular communication network.

An electronic device and a method for operating an electronic device according to various embodiments of the disclosure may determine whether or not a cellular communication network supports a specific service using first cellular communication, based on mapping data in which identification information of the cellular communication network and information indicating whether the cellular communication network supports the specific service using the first cellular communication are mapped and identification information of the cellular communication network. In response to identifying that the specific service using the first cellular communication is not supported, the electronic device may stop searching for a node through the first cellular communication and may search for a node through second cellular communication. Therefore, the electronic device and the method for operating the electronic device may not search for a base station supporting the specific service using the first cellular network, on a cellular communication network that does not support the specific service using the first cellular communication, thereby reducing the delay time necessary for registration with the cellular communication network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 is a block diagram of an electronic device according to an embodiment of the disclosure;

Throughout the drawings, it should be noted that like reference numbers are used to depict the same or similar elements, features, and structures.

MODE FOR THE INVENTION

Figure 2:
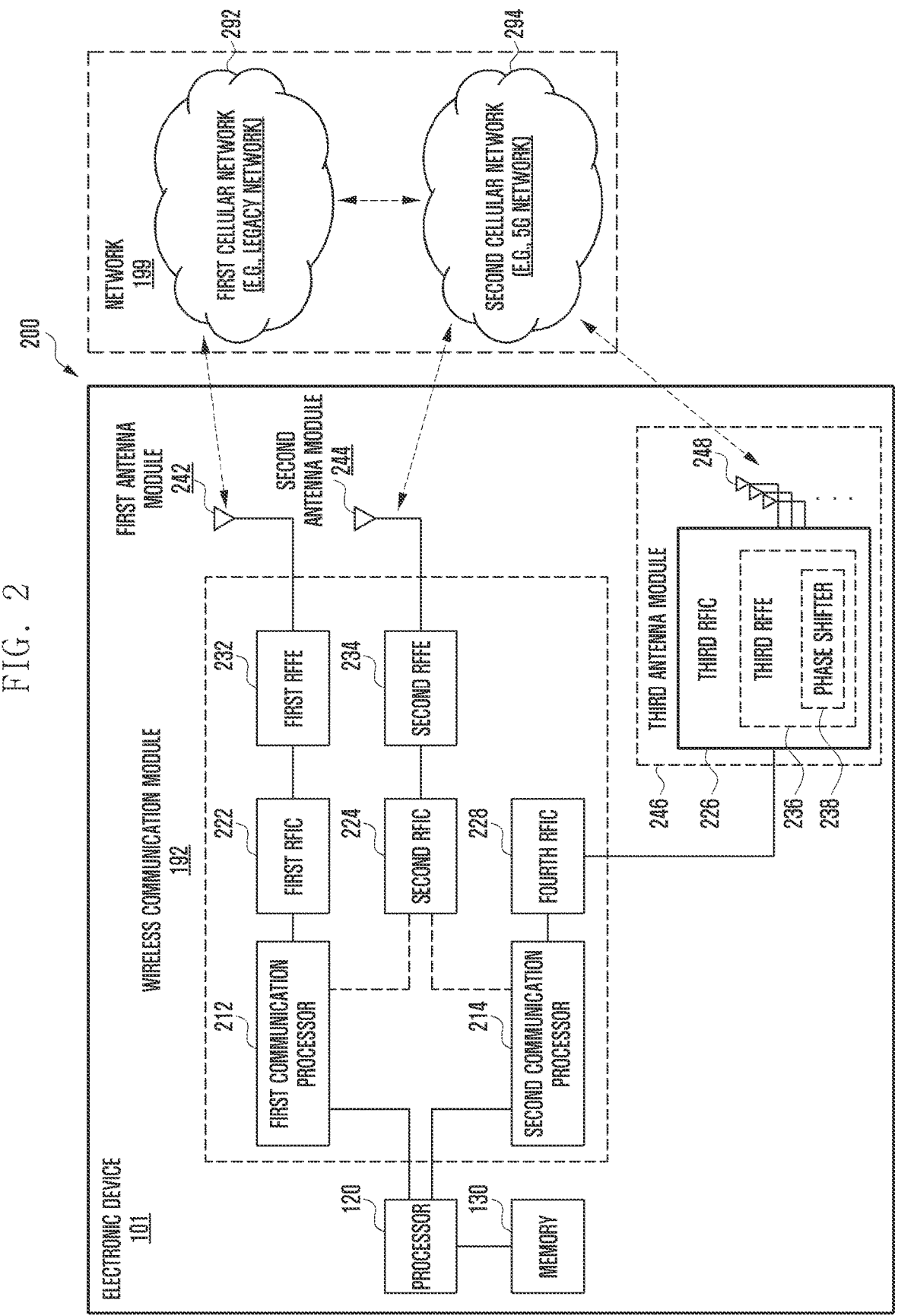
FIG. 2 is a block diagram of an electronic device for supporting legacy network communication and 5G network communication according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module or device 150, a sound output module or device 155, a display module or device 160, an audio module 170, a sensor module 176, an interface 177, a connection terminal 178, a haptic module 179, a camera module 180, a power management module 188, a battery 189, a communication module 190, a subscriber identification module (SIM) 196, and/or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and/or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, and/or applications 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or recordings. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement)

or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to or consumed by the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram of an electronic device for supporting legacy network communication and 5G network communication according to an embodiment of the disclosure.

Referring to FIG. 2, the electronic device 101 of block diagram 200 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first network 292 and a second network 294. According to another embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel According to certain embodiments, the first network may be a legacy network including 2nd generation (2G), 3rd generation (3G), 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the subprocessor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by a third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form a third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6 RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., NR protocol information) for communication with the 5G network may be stored in the memory 230, and may be accessed by another component (e.g., the processor 120, the first communication processor 212, or the second communication processor 214).

Figure 3:
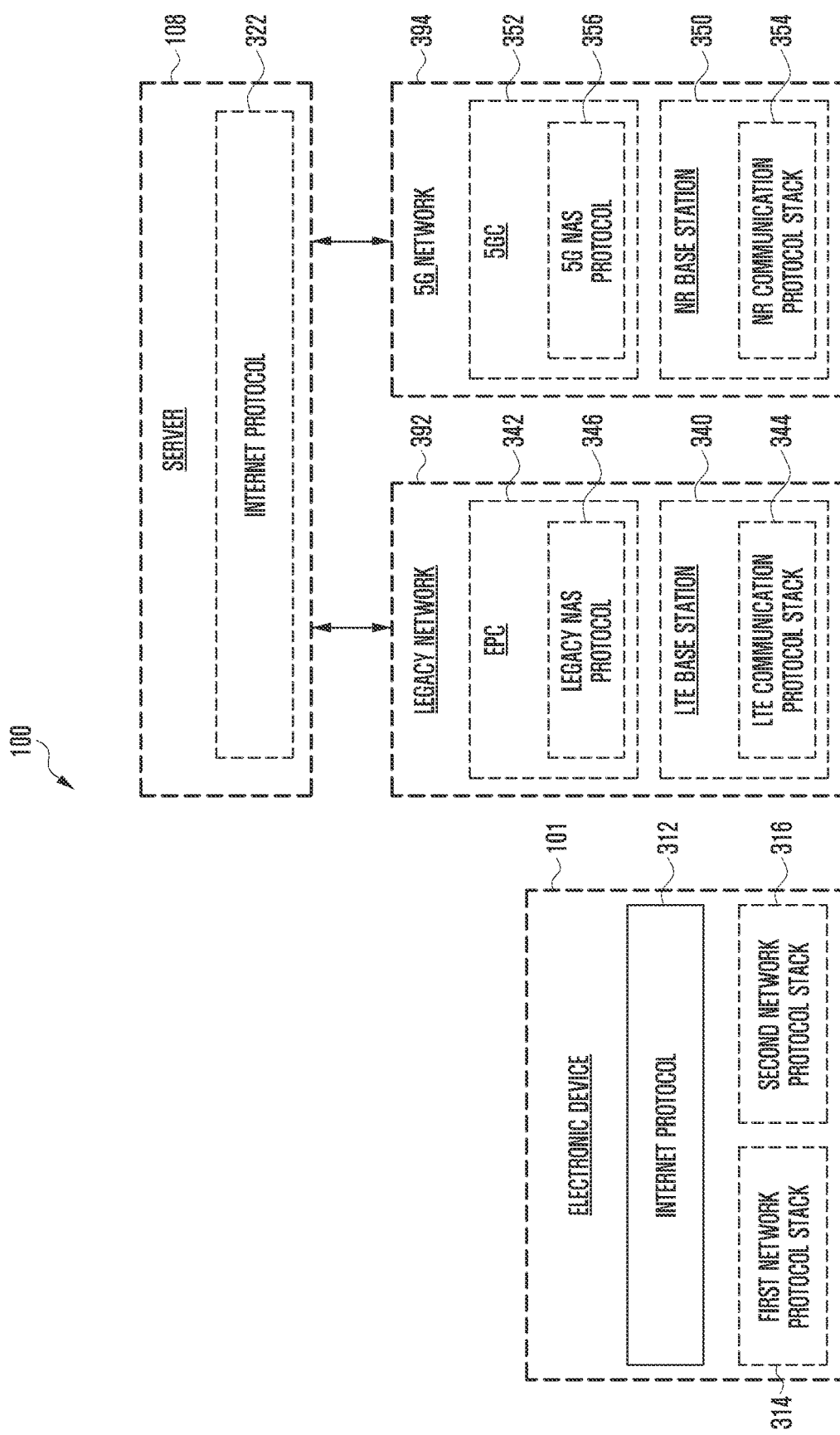
FIG. 3 illustrates a protocol stack structure of a network of legacy communication and/or 5G communication according to an embodiment of the disclosure.

FIG. 3 illustrates a protocol stack structure of a network of legacy communication and/or 5G communication according to an embodiment of the disclosure.

Referring to FIG. 3, the network 100 according to an illustrated embodiment may include the electronic device 101, a legacy network 392, a 5G network 394, and the server 108.

The electronic device 101 may include an Internet protocol 312, a first communication or network protocol stack 314, and a second communication or network protocol stack 316. The electronic device 101 may communicate with the server 108 through the legacy network 392 and/or the 5G network 394.

According to an embodiment, the electronic device 101 may perform Internet communication associated with the server 108 through the Internet protocol (IP) 312 (for example, a transmission control protocol (TCP), a user datagram protocol (UDP), or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE evolved Node B (eNode B or eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY)

layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
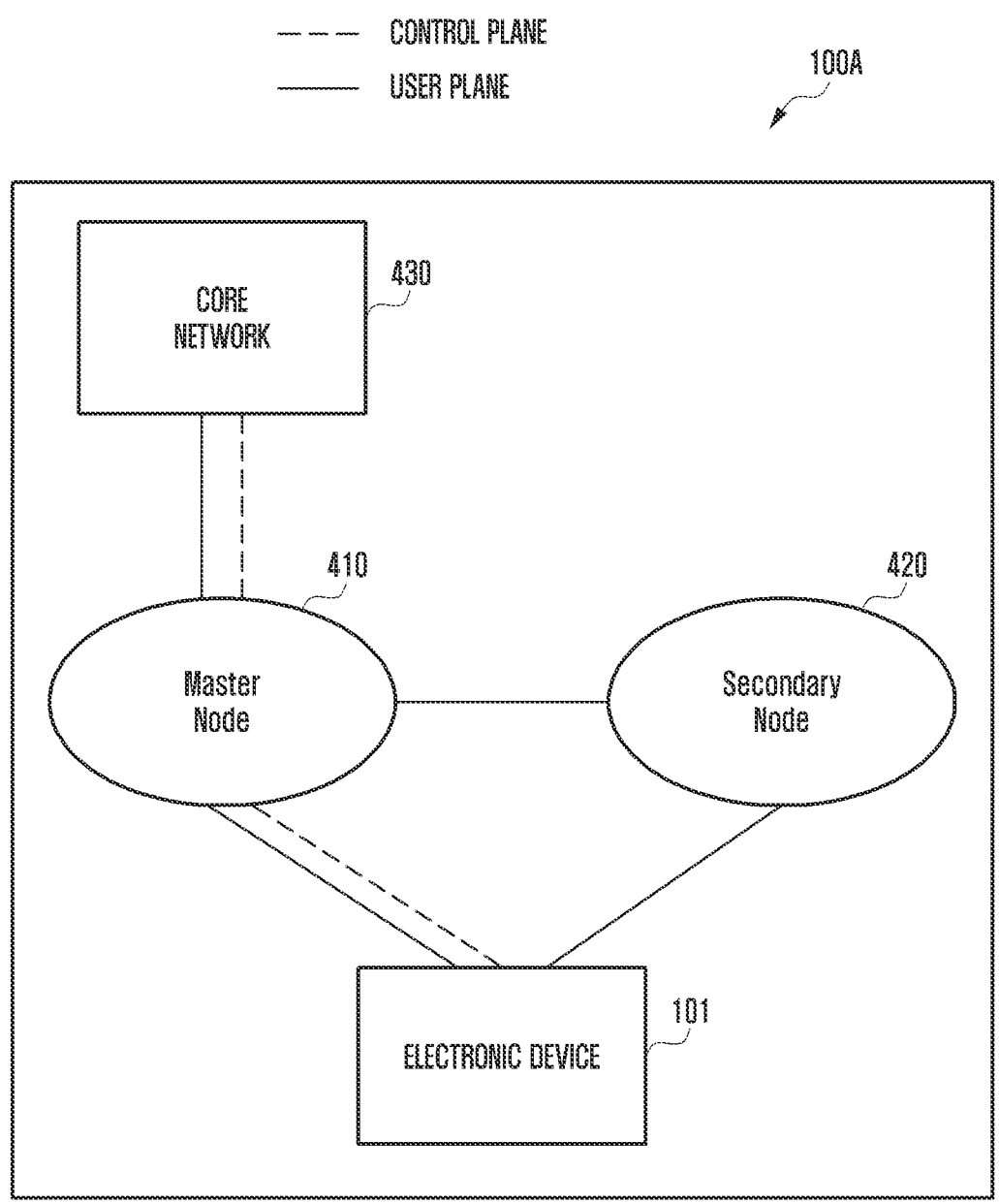
FIGS. 4A, 4B, and 4C illustrate wireless communication systems for providing a network of legacy communication and/or 5G communication according to various embodiments of the disclosure.

FIG. 4A illustrates a wireless communication system providing a network of legacy communication and/or 5G communication according to an embodiment of the disclosure.

Figure 4B:
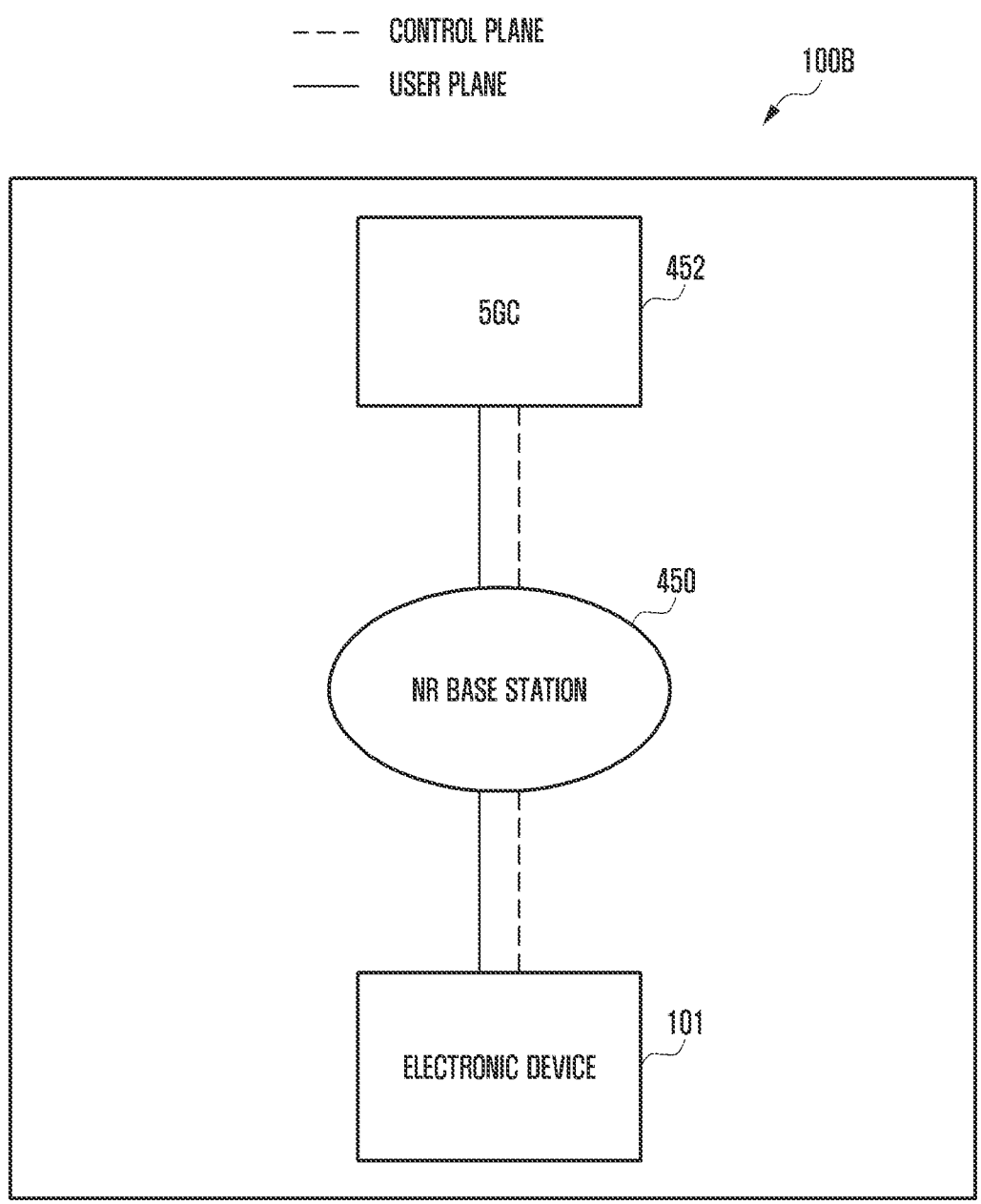

FIG. 4B also illustrates a wireless communication system providing a network of legacy communication and/or 5G communication according to an embodiment of the disclosure.

Figure 4C:
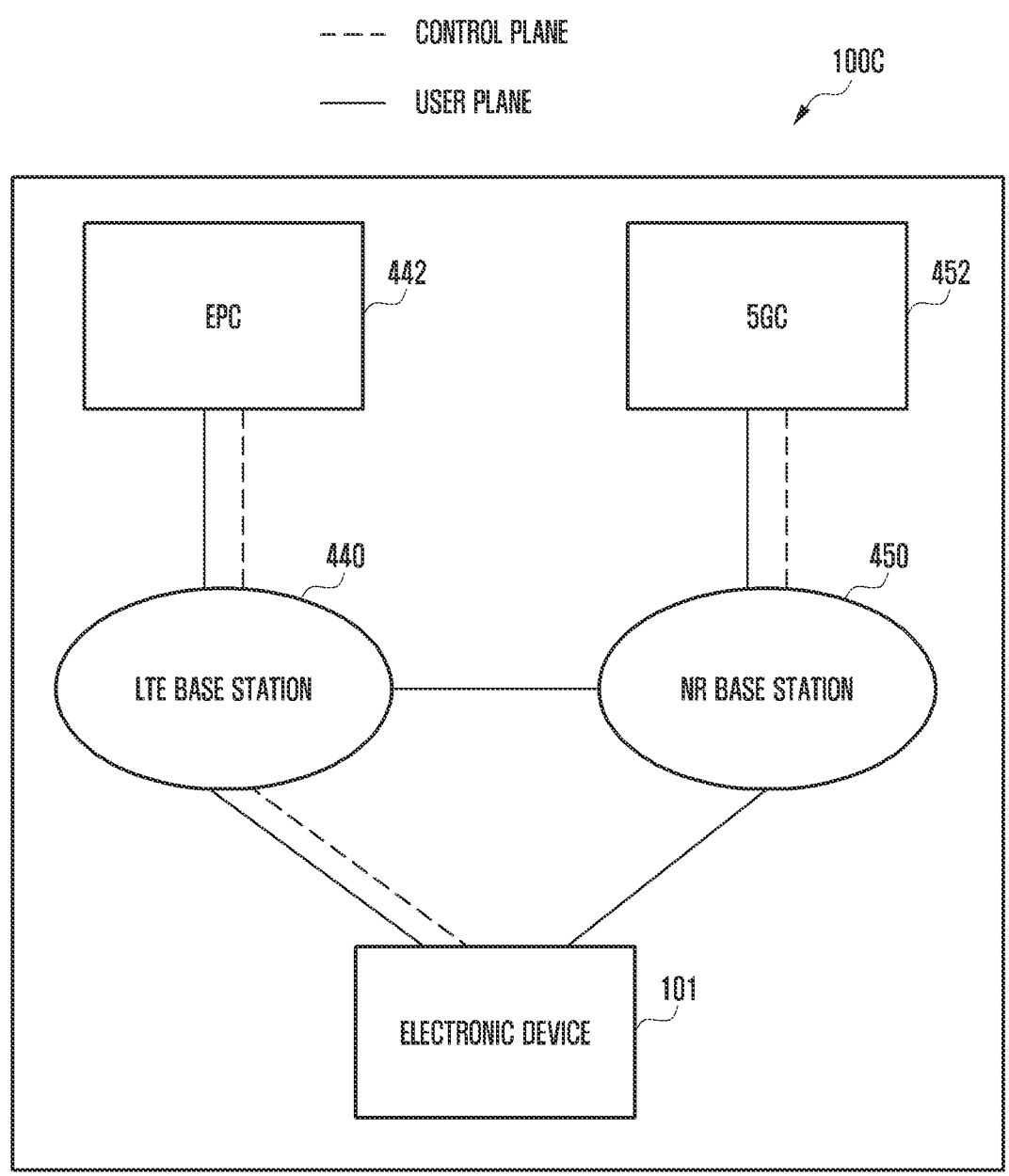

FIG. 4C also illustrates a wireless communication system providing a network of legacy communication and/or 5G communication according to an embodiment of the disclosure.

Referring to FIGS. 4A to 4C, network environments 100A to 100C may include at least one of a legacy network and a 5G network. The legacy network may include, for example, a 4G or LTE eNB 440 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a next generation Node B (gNodeB or gNB)) supporting radio access with the electronic device 101 and a 5th generation core (5GC) 452 for managing 5G communication of the electronic device 101.

According to certain embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, an EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments, the MN 410 may include the LTE eNB 440, the SN 420 may include the NR gNB 450, and the core network 430 may include the EPC 442. For example, a control message may be transmitted and received through the LTE eNB 440 and the EPC 442, and user data may be transmitted and received through the LTE eNB 440 and the NR gNB 450.

Referring to FIG. 4B, according to certain embodiments, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 440. According to another embodiment, the electronic device 101 and the 5GC 452 may transmit and receive a control message and user data through the NR gNB 450.

According to certain embodiments, the electronic device 101 may be registered in at least one of the EPC 442 or the 5GC 452 and transmit and receive a control message.

According to certain embodiments, the EPC 442 or the 5GC 452 may interwork and manage communication of the electronic device 101. For example, movement information of the electronic device 101 may be transmitted and received through an interface between the EPC 442 and the 5GC 452.

Figure 5A:
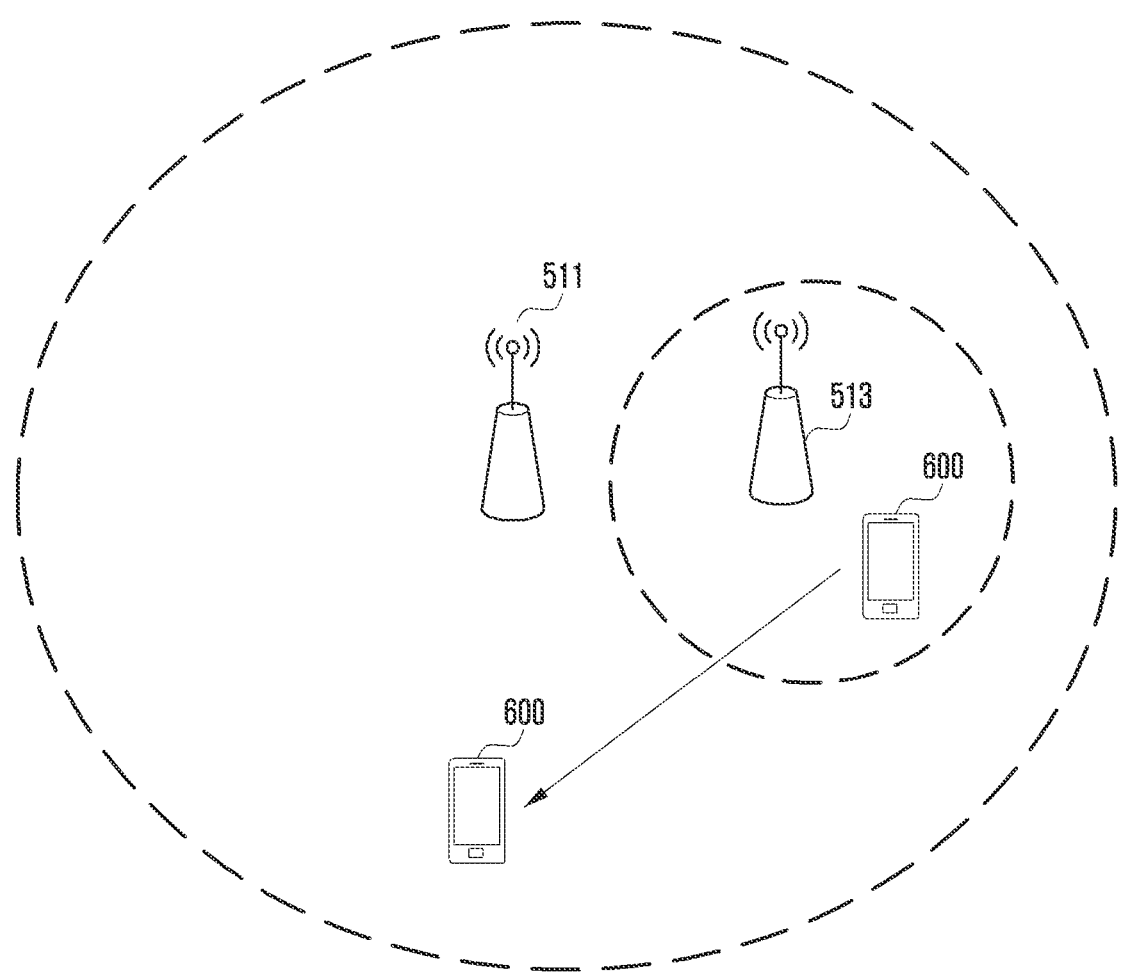
FIGS. 5A and 5B illustrate a node for supporting first cellular communication and/or second cellular communication according to various embodiments of the disclosure.
Figure 5B:
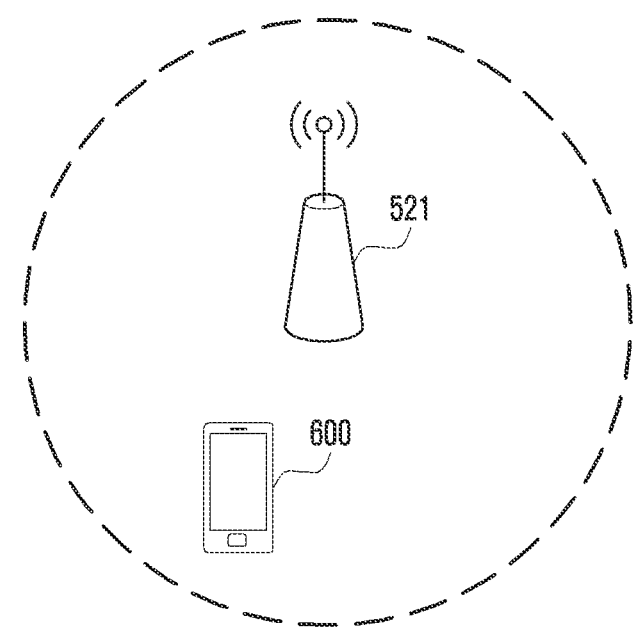

FIGS. 5A and 5B illustrate a node for supporting first cellular communication and/or second cellular communication according to various embodiments of the disclosure.

Referring to FIG. 5A, FIG. 5A illustrates a state in which there is a node 511 for supporting first cellular communication and a node 521 for supporting second cellular communication.

An electronic device 600 (e.g., the electronic device 101 in FIG. 1) according to various embodiments of the disclosure may transmit or receive data to or from various external electronic devices in the first cellular communication or the second cellular communication through a node (e.g., the master node 410 in FIG. 4A, the secondary node 420 in FIG. 4A, the NR gNB 450 in FIG. 4B, the LTE eNB 440 in FIG. 4C, or the NR gNB 450 in FIG. 4C) 511, 513, or 521.

The first cellular communication is one communication scheme among various cellular communication schemes that can be supported by the electronic device 600, and, for example, may imply a communication scheme in the second cellular network 294 in FIG. 2. For example, the first cellular communication may be one scheme of 5th-generation mobile communication schemes (e.g., 5G on below 6 GHz and 5G on above 6 GHz).

The second cellular communication may imply one communication scheme among various cellular communication schemes that can be supported by the electronic device 600. For example, the second cellular communication is one scheme among 4th-generation mobile communication schemes (e.g., long-term evolution (LTE), LTE-advanced (LTE-A), and LTE Advanced pro (LTE-A pro))_or a 3rd-generatin mobile communication scheme (e.g., a Universal Mobile Telecommunication System (UMTS)), and, for example, may imply a communication scheme in the first cellular network in FIG. 2.

According to various embodiments of the disclosure, the first cellular communication may be a relatively high-generation communication standard compared with the second cellular communication. The first cellular communication may implement a data exchange using a high frequency band compared with the second cellular communication, and may realize a higher data transfer rate than the second cellular communication. Due to the property of the first cellular communication that can realize a relatively high data transfer rate, the electronic device 600 may be configured to connect the first cellular communication before the second cellular communication.

According to various embodiments of the disclosure, the electronic device 600 may support an NSA mode or an SA mode of the first cellular communication. The NSA mode may be a mode in which the electronic device 600 transmits or receives data through the node 513 configured to support the first cellular communication and a node 511 configured to support the second cellular communication. The SA mode may be a mode in which the electronic device 600 transmits or receives data through the node 513 configured to support the first cellular communication.

According to various embodiments of the disclosure, the electronic device 600 may search for the node 513 configured to support the first cellular communication through the first cellular communication. The node 513 configured to support the first cellular communication may be a node configured to support the SA mode of the first cellular communication. When the electronic device 600 is positioned within the coverage of the node 513 configured to support the first cellular communication, the electronic device 600 may search for the node 513 configured to support the first cellular communication, and may perform, through the found node 513, a registration procedure with a cellular communication network (e.g., the network environment 100c in FIG. 4C)) for supporting the first cellular communication. After the registration procedure is completed, the electronic device 600 may transmit data to an external electronic device (e.g., the electronic device 104 in FIG. 1) through the first cellular communication, or may receive data transmitted by the external electronic device 104.

According to various embodiments of the disclosure, the electronic device 600 may be positioned within the coverage of the node 513 configured to support the SA mode of the first cellular communication, and then may move out of the coverage of the node 513, which does not support the SA mode of the first cellular communication. When the electronic device 600 is not positioned within the coverage of the node 513 which supports the SA mode of the first cellular communication, the electronic device 600 may fail to discover the node 513 which supports the SA mode of the first cellular communication. In response to failing to discover the node 513 which supports the SA mode of the first cellular communication, the electronic device 600 may search for the node 511 which supports the second cellular communication. The electronic device 600 may search for the node 511 which supports the second cellular communication, and may perform, through the found node 511, a registration procedure with the cellular communication network 100c which supports the second cellular communication. After the registration procedure is completed, the electronic device 600 may transmit data to the external electronic device 104 through the second cellular communication, or may receive data transmitted by the external electronic device 104.

According to various embodiments of the disclosure, the node 511 configured to support the second cellular communication (e.g., LTE) may be a node configured to support the NSA mode of the first cellular communication. The electronic device 600 may first perform a registration procedure with the node 511 configured to support the second cellular communication, and then may perform the registration procedure with a separate node (not shown) configured to support the NSA mode of the first cellular communication. The electronic device 600 may transmit or receive data through the node 511 configured to support the second cellular communication and the separate node configured to support the NSA mode of the first cellular communication.

When the electronic device 600 is configured to connect the first cellular communication supporting an SA mode before connecting the second cellular communication, even in a cellular communication network which does not support the SA mode of the first cellular communication, the electronic device 600 may perform an operation of searching for a node through the first cellular communication before performing an operation of searching for a node through the second cellular communication. Alternatively, when the latest connected cellular communication is the first cellular communication, in a cellular communication network which does not support the SA mode of the first cellular communication, the electronic device 600 may perform an operation of searching for a node through the first cellular communication before performing an operation of searching for a node through the second cellular communication.

In a cellular communication network which supports the first cellular communication and/or the second cellular communication, when the latest connected cellular communication is the second cellular communication, the electronic device 600 may perform an operation of searching for a node through the second cellular communication. The electronic device 600 may perform connection to the node 511 which supports the second cellular communication, and then may perform an operation of searching for the node 513 configured to support the first cellular communication, again and registering the same, in order to use the first cellular communication.

Even in the environment in which there is the node 511 configured to support the SA mode of the first cellular communication, the electronic device 600 may perform an unnecessary operation in order to search for the node 511 configured to support the second cellular communication, and thus a delay time for registering the node 513 configured to support the SA mode of the first cellular communication may increase.

Alternatively, even in the environment in which there is no node 511 configured to support the SA mode of the first cellular communication, in order to search for the node 513 configured to support the SA mode of the first cellular communication, the electronic device 600 may perform an operation of searching for a node through the first cellular communication. The electronic device 600 may receive system information broadcast by a found node (e.g., a node which supports the first cellular communication but supports an NSA mode), and may determine, based on the system information, that the found node does not support the SA mode of the first cellular communication. The electronic device 600 may stop the node searching operation using the first cellular communication and search for a node which supports the second cellular communication. The electronic device 600 performs an unnecessary operation, and thus a delay time up to the registration of the node 511 configured to support the second cellular communication may increase.

FIG. 5B illustrates an environment in which there is no node 513 configured to support the first cellular communication and there is only the node 521 configured to support the second cellular communication.

When a cellular communication network does not support the first cellular communication (or does not support the SA mode of the first cellular communication), there may be only the node 521 configured to support the second cellular communication.

Referring to FIG. 5B, in the environment in which there is no node 513 configured to support the first cellular communication, the electronic device 600 may attempt to perform an operation of searching for the node 513 through the first cellular communication before to perform an operation of searching for the node 521 through the second cellular communication. The electronic device 600 may fail to discover the node 513 configured to support the SA mode of the first cellular communication. When failing to discover the node 513 configured to support the SA mode of the first cellular communication, the electronic device 600 may search for the node 521 configured to support the second cellular communication. The electronic device 600 may search for the node 521 configured to support the second cellular communication, and then may perform, through the found node 521, a registration procedure with a cellular communication network which supports the second cellular communication. The electronic device 600 may determine, through system information (e.g., a system information block (SIB) 24) broadcast by the nodes 511 and 521, whether the cellular communication network supports the first cellular communication. However, the system information may not include information about whether the SA mode of the first cellular communication is supported. In this case, it may be difficult for the electronic device 600 to determine whether the cellular communication network supports the SA mode of the first cellular communication. Even when the cellular communication network does not support the SA mode of the first cellular communication, the electronic device 600 searches for a node configured to support the SA mode of the first cellular communication, and thus a delay time necessary for performing registration with the cellular communication network may increase.

Hereinafter, a description will be made of an embodiment in which the electronic device 600 may reduce a time necessary for node searching on the basis of mapping data and identification information of the cellular communication network.

Figure 6:
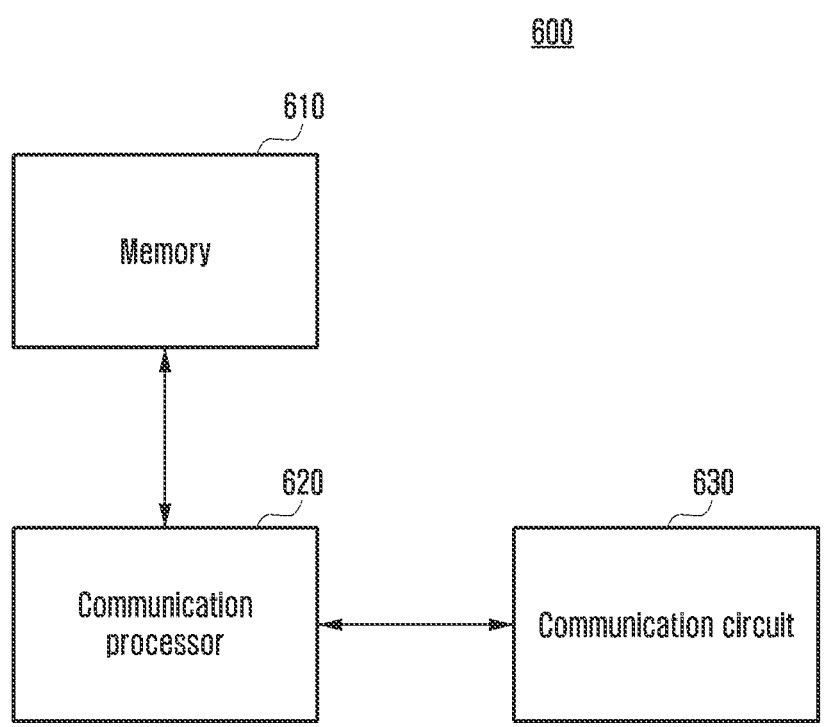
FIG. 6 is a block diagram illustrating an electronic device according to an embodiment of the disclosure.

FIG. 6 is a block diagram illustrating an electronic device according to an embodiment of the disclosure.

Referring to FIG. 6, the electronic device 600 (e.g., the electronic device 101 in FIG. 1) according to various embodiments of the disclosure may include a memory 610 (e.g., the memory 130 in FIG. 1), a communication processor 620 (e.g., the first communication processor 212 or the second communication processor 214 in FIG. 2), and/or a communication circuit 630 (e.g., the communication module 190 in FIG. 1).

According to various embodiments of the disclosure, the memory 610 may store mapping data in which identification information of a cellular communication network and information indicating whether the cellular communication network supports an SA mode of first cellular communication are mapped. The identification information of the cellular communication network may include public land mobile network (PLMN) information implemented as a mobile country code (MCC) or a combination of an MCC and a mobile network code (MNC). The mapping data may be generated at the time of manufacturing of the electronic device 600 and stored in the memory 610, and may be updated by the cellular communication network. The mapping data may be implemented as shown in the following Table 1.

TABLE 1

| | Identification information of cellular communication network | Is SA mode of first cellular communication supported? |
|---|---|---|
| First cellular communication network | MCC1 | Y |
| Second cellular communication network | PLMN1 | N |
| Third cellular communication network | PLMN2 | Y |
| Fourth cellular communication network | MCC2 | N |

According to various embodiments of the disclosure, the mapping data may further include information related to a cellular communication network. For example, the mapping data may further include information indicating whether the cellular communication network supports a specific service using first cellular communication. For example, the specific service may include voice over NR (VoNR) using the first cellular communication. When the mapping data further includes the information indicating whether the cellular communication network supports a specific service using first cellular communication, the mapping data may be implanted as shown in Table 2.

TABLE 2

| | Identification information of cellular communication network | Is SA mode of first cellular communication supported? | Is specific service supported? |
|---|---|---|---|
| First cellular communication network | MCC1 | Y | Y |
| Second cellular communication network | PLMN1 | N | Y |
| Third cellular communication network | PLMN2 | Y | N |
| Fourth cellular communication network | MCC2 | N | N |

According to various embodiments of the disclosure, the communication processor 620 may perform various operations for wireless communication in a cellular communication network. For example, the communication processor 620 may establish a communication channel for a band to be used for wireless communication with the cellular communication network, and may support wireless communication using the established communication channel.

According to various embodiments of the disclosure, on the basis of control of the communication processor 620, the communication circuit 630 may receive an external signal through an antenna (e.g., the first antenna module 242, the second antenna module 244, or the third antenna module 248 in FIG. 2), or may radiate, through the antenna 242, 244, or 248, a signal transmitted by the communication processor 620. The communication circuit 630 may perform, based on the control of the communication processor 620, an operation of searching for the nodes 511, 513, and 521 to be connected. The communication circuit 630 may search for the node 513 configured to support the first cellular communication, based on whether a signal broadcast by the nodes 511, 513, and 521 in a frequency band supported by the first cellular communication is received. The communication circuit 630 may search for the nodes 511 and 521 configured to support a second cellular communication, based on whether a signal broadcast by the nodes 511, 513, and 521 in a frequency band supported by the second cellular communication is received. The communication circuit 630 may search for the nodes 511, 513, and 521 while changing a frequency band to be received. The communication processor 620 may select, as a node to be connected thereby, a node which broadcasts a signal having the best quality, among the nodes 511, 513, and 521 found based on the quality of received signals.

According to various embodiments of the disclosure, the communication processor 620 may search for a node for connecting cellular communication on the basis of a designated condition (e.g., the node 513 configured to support the first cellular communication in FIG. 5A, or the nodes 511 and 521 configured to support the second cellular communication in FIGS. 5A and 5B). The designated condition may include a condition of performing node searching through specific communication among the first cellular communication and the second cellular communication or a condition of performing node searching through the latest connected cellular communication.

For example, when the designated condition is a condition of first performing node searching through the first cellular communication, or when the latest connected cellular communication is the first cellular communication, the communication processor 620 may perform node searching through the first cellular communication.

In another example, when the designated condition is a condition of first performing node searching through the second cellular communication or when the latest connected cellular communication is the second cellular communication, the communication processor 620 may perform node searching through the second cellular communication.

According to various embodiments of the disclosure, the communication processor 620 may receive system information from a found node during node searching. The system information may include identification information of a cellular communication network corresponding to the found node.

According to an embodiment, the communication processor 620 may receive system information (e.g., SIB 1) from a found node (e.g., the nodes 511 or 521 configured to support the second cellular communication) during node searching using the second cellular communication.

According to an embodiment, the communication processor 620 may receive system information (e.g., SIB 1) from the found node 513 during node searching using the first cellular communication.

According to various embodiments of the disclosure, the communication processor 620 may determine identification information of the cellular communication network, included in the system information received from the found nodes 511, 513, and 521. The communication processor 620 may determine, based on the mapping data and the identification information of the cellular communication network, whether the cellular communication network supports the SA mode of the first cellular communication.

Referring to Tables 1 and 2, the communication processor 620 may receive system information from the found nodes 511 and 513, and may determine identification information (MCC 1 and PLMN2) of cellular communication networks corresponding to the found nodes 511 and 513. The communication processor 620 may determine, based on the mapping data, whether the SA mode of first cellular communication corresponding to the determined identification information (MCC 1 and PLMN2) is supported. Referring to Tables 1 and 2, the communication processor 620 may determine that the cellular communication networks corresponding to the determined identification information (MCC 1 and PLMN 2) support the SA mode of the first cellular communication. The communication processor 620 may determine that cellular communication networks corresponding to the determined identification information (PLMN 1 and MCC 2) do not support the SA mode of the first cellular communication.

According to various embodiments of the disclosure, when it is determined that the SA mode of the first cellular communication is not supported, the communication processor 620 may stop or may not perform an operation of searching for the nodes 511, 513, and 521 through the first cellular communication. In a state of searching for the nodes 511, 513, and 521 through the first cellular communication, when it is determined that the SA mode of the first cellular communication is not supported, the communication processor 620 may stop an operation of searching for the nodes 511, 513, and 521 through the first cellular communication. In a state of searching for the nodes 511, 513, and 521 through the second cellular communication, when it is determined that the SA mode of the first cellular communication is not supported, the communication processor 620 may not perform an operation of searching for the nodes 511, 513, and 521 through the first cellular communication. In a state of searching for the nodes 511, 513, and 521 through the first cellular communication, when it is determined that the SA mode of the first cellular communication is not supported, the communication processor 620 may perform an operation of searching for the nodes 511, 513, and 521 through the second cellular communication.

According to various embodiments of the disclosure, when it is determined that the SA mode of the first cellular communication is supported, the communication processor 620 may maintain or perform an operation of searching for the nodes 511, 513, and 521 through the first cellular communication. In a state in which the communication processor 620 performs node searching through the first cellular communication, when it is determined that the SA mode of the first cellular communication is supported, the communication processor 620 may maintain an operation of searching for the nodes 511, 513, and 521 through the first cellular communication. In a state in which the communication processor 620 performs node searching through the second cellular communication, when it is determined that the SA mode of the first cellular communication is supported, the communication processor 620 may stop an operation of performing node searching through the second cellular communication, and may perform node searching through the first cellular communication.

According to various embodiments of the disclosure, while performing node searching through the first cellular communication and/or the second cellular communication, the electronic device 600 may determine, based on the received system information, whether the cellular communication networks support the SA mode of the first cellular communication. The electronic device 600 may configure a frequency band for node searching on the basis of whether the SA mode of the first cellular communication is supported, and thus can perform relatively quick node searching.

According to various embodiments of the disclosure, the communication processor 620 may be implemented such that searching for the nodes 511, 513, and 521 can be performed by simultaneously using the first cellular communication and the second cellular communication. While performing a search for the nodes 511, 513, and 521 through the first cellular communication and the second cellular communication, the communication processor 620 may determine, based on received system information and mapping data, whether a cellular communication network supports the SA mode of the first cellular communication. When it is determined that the cellular communication network supports the SA mode of the first cellular communication, the communication processor 620 may search for the nodes 511, 513, and 521 through the first cellular communication (or may maintain searching for the nodes 511, 513, and 521 through the first cellular communication and the second cellular communication). When it is determined that the cellular communication network does not support the SA mode of the first cellular communication, the communication processor 620 may stop searching for the nodes 511, 513, and 521 through the first cellular communication, and search for the nodes 511, 513, and 521 through the second cellular communication.

According to various embodiments of the disclosure, while searching for the nodes 511, 513, and 521, the communication processor 620 may control an operation of searching for the nodes 511, 513, and 521 by the communication circuit 630, based on information which is included in the received system information and indicates whether a specific service using the first cellular communication is supported. For example, the specific service using the first cellular communication may be various services including a voice call service through the first cellular communication (e.g., VoNR).

According to various embodiments of the disclosure, the communication processor 620 may determine, based on mapping data and identification information of a cellular communication network included in the system information received from the found nodes 511, 513, and 521, whether the cellular communication network supports the specific service using the first cellular communication. With reference to information which is included in the mapping data and indicates whether the specific service using the first cellular communication are supported, the communication processor 620 may determine whether the cellular communication network supports the specific service using the first cellular communication. When it is determined the cellular communication network does not support the specific service, the communication processor 620 may stop or may not perform an operation of searching for the nodes 511, 513, and 521 through the first cellular communication. When it is determined that the cellular communication network supports the specific service, the communication processor 620 may maintain or perform an operation of searching for the nodes 511, 513, and 521 through the first cellular communication.

For example, the electronic device 600 may include at least two subscriber identity modules (SIM) (e.g., the subscriber identify module 196 in FIG. 1). The at least two subscriber identify modules 196 may include a default data service (DDS) SIM, which the electronic device 600 uses to transmit or receive data, and/or a non-DDS SIM which is not used for data transmission or reception but used to make or receive a phone call. The electronic device 600 may perform, based on identification information stored in the non-DDS SIM, a registration with a node configured to support the first cellular communication, and may be connected with the node at a predetermined period in order to transmit or receive a paging message. However, when the node 513 configured to support the first cellular communication does not support VoNR which is a voice call service using the first cellular communication, the electronic device 600 may be required to release connection with the node 513, in response to reception of the paging message, and perform reconnection with node 511 configured to support the second cellular communication.

For connection of a node corresponding to the non-DDS SIM, the communication processor 620 may perform an operation of searching for the node 513. The communication processor 620 may receive system information broadcast by the node 513, and may determine, based on mapping data and identification information of a cellular communication network included in the system information, whether the cellular communication network supports the specific service (e.g., VoNR) using the first cellular communication. When it is determined that the cellular communication network does not support the specific service using the first cellular communication, the communication processor 620 may stop an operation of searching for the nodes 511, 513, and 521 through the first cellular communication and perform an operation of searching for the nodes 511, 513, and 521 through the second cellular communication. The communication processor 620 may perform a registration procedure with a node found by a node searching operation using the second cellular communication. The electronic device 600 may control, based on information indicating whether the specific service is supported, a frequency band to be found, thereby reducing a delay time caused by changing a registered node in order to perform the specific service in a state in which the same is registered with the node 513 which does not support the specific service.

In the above-described embodiment, it is described that the at least two subscriber identity modules applied to the electronic device 600 may be implemented as a DDS or a non-DDS. However, the above-described embodiment may also be applied to multiple DDS subscriber identity modules. In an electronic device having the multiple DDS subscriber identity modules, the above-described embodiment may be applied even in a state in that one subscriber identity module stops data transmission/reception.

According to various embodiments of the disclosure, the communication processor 620 may update the mapping data on the basis of the system information received through an operation of searching for the nodes 511, 513, and 521.

When the cellular communication network supports the SA mode of the first cellular communication but when the mapping data does not include information indicating whether the SA mode of the first cellular communication is supported, the communication processor 620 may perform an operation of searching for the nodes 511, 513, and 521 through the second cellular communication.

The communication processor 620 may receive system information from a node 511 or 521 found while searching for the node 511 or 521 through the second cellular communication. The system information may include information about whether there is the node 513 configured to support the first cellular communication and about the node 513 configured to support the first cellular communication. For example, the node included in the system information may be a node which supports the SA mode of the first cellular communication. The system information may include SIB 24 defined in 3GPP TS 36.331 v15.6. The SIB 24 may include identification information of the node 513 configured to support first cellular communication, a frequency band supported by the node 513 configured to support the first cellular communication, and/or physical identification information of the node 513 configured to support the first cellular communication.

The communication processor 620 may receive signal, broadcast by the node 513, on the basis of the frequency band and/or the identification information of the node 513 configured to support the first cellular communication which are included in the system information. The communication processor 620 may determine, based on system information (e.g., SIB 1) included in the signal, whether the node 513 supports the SA mode of the first cellular communication. The communication processor 620 may update mapping data by adding, to the mapping data, identification information of a cellular communication network corresponding to the node 513 and information about whether the SA mode of the first cellular communication is supported.

The communication processor 620 may receive a signal broadcast by the node 513 found while searching for the node 513 through first cellular communication. The communication processor 620 may determine, based on system information (e.g., SIB 1) included in the signal, whether the node 513 supports the SA mode of the first cellular communication. Mapping data may be updated by adding, to the mapping data, identification information of a cellular communication network corresponding to the node 513 and information about whether the SA mode of the first cellular communication is supported. For example, the system information (e.g., SIB 1) may include or may not include an IE of a tracking area code (TAC). In another example, the system information may include or may not include a cellselectioninfo field. The fact that a TAC field or the cellselectioninfo field is included in the system information may imply that the node 513 broadcasting the system information supports the SA mode of the first cellular communication. The fact that the TAC field or the cellselectioninfo field is not included in the system information may imply that the node 513 broadcasting the system information does not support the SA mode of the first cellular communication. The communication processor 620 may update the mapping data on the basis of whether the TAC field or the cellselectioninfo field is included in the system information.

When it is determined, based on the identification information of the cellular communication network and the mapping data, that the cellular communication network does not support the SA mode of the first cellular communication, the communication processor 620 may stop node searching using the first cellular communication and search for a node through the second cellular communication, or may maintain an operation of searching for a node through the second cellular communication. The communication processor 620 may determine, based on system information (e.g., SIB 24) broadcast by the node 511 configured to support the second cellular communication, that the node 513 configured to support the first cellular communication exists around the node 511 configured to support the second cellular communication. The communication processor 620 may determine, based on the system information (e.g., SIB 1) transmitted by the node 513 found through the first cellular communication, that the cellular communication network supports the SA mode of the first cellular communication. In this case, the communication processor 620 may add, to the mapping data, information indicating that the cellular communication network supports the SA mode of the first cellular communication, or may correct the information.

Figure 7:
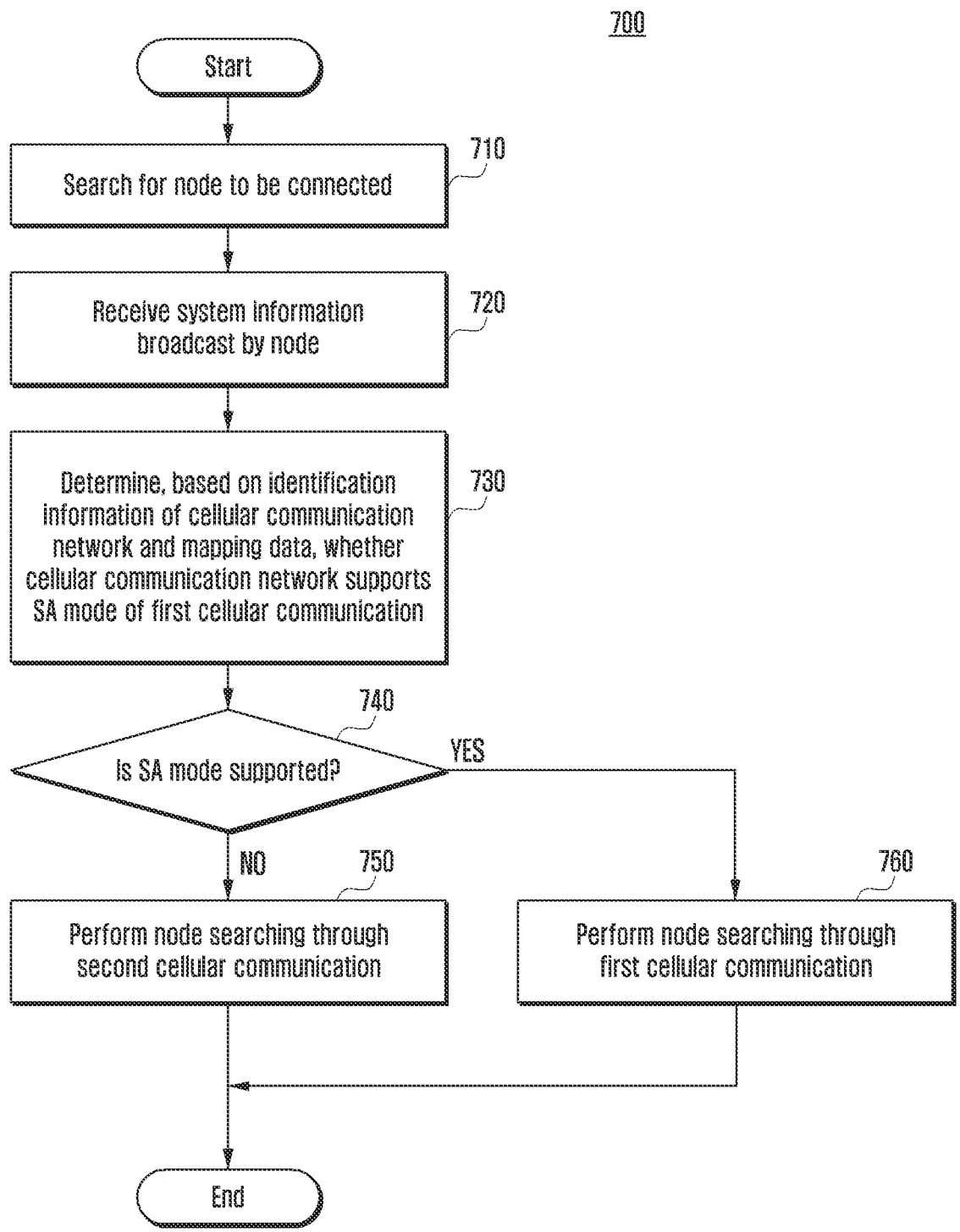
FIG. 7 is an operation flowchart illustrating an operation method of an electronic device according to an embodiment of the disclosure.

FIG. 7 is an operation flowchart illustrating an operation method of an electronic device according to an embodiment of the disclosure.

Referring to FIG. 7, according to various embodiments of the disclosure, in operation 710 of flowchart 700, an electronic device (e.g., the electronic device 600 in FIG. 6) may search for a node (e.g., the node 513 configured to support first cellular communication in FIG. 5A or nodes 511 and 521 configured to support second cellular communication in FIGS. 5A and 5B) to which the same is to be connected.

According to various embodiments of the disclosure, the electronic device 600 may search for a node through a frequency band corresponding to first cellular communication. In this case, the electronic device 600 may search for the node 513 configured to support the first cellular communication.

According to various embodiments of the disclosure, the electronic device 600 may search for a node through a frequency band corresponding to second cellular communication. In this case, the electronic device 600 may search for the nodes 511 and 521 configured to support the second cellular communication.

According to various embodiments of the disclosure, the electronic device 600 may search for the nodes 511, 513, and 521 for connecting cellular communication according to a designated condition. The designated condition may include a condition of performing node searching through specific communication among the first cellular communication and the second cellular communication or a condition of performing node searching through the latest connected cellular communication.

For example, when the designated condition is a condition of first performing node searching through the first cellular communication or when the latest connected cellular communication is the first cellular communication, the electronic device 600 may perform node searching through the first cellular communication.

In another example, when the designated condition is a condition of first performing node searching through the second cellular communication or when the latest connected cellular communication is the second cellular communication, the electronic device 600 may perform node searching through the second cellular communication.

According to various embodiments of the disclosure, in operation 720, the electronic device 600 may receive system information broadcast by the nodes 511, 513, and 521.

According to various embodiments of the disclosure, the electronic device 600 may determine identification information of a cellular communication network, included in the system information received from the found nodes 511, 513, and 521. The identification information of the cellular communication network may include PLMN information which is implemented as an MCC or a combination of an MCC and an MNC.

According to various embodiments of the disclosure, in operation 730, the electronic device 600 may determine, based on the identification information of the cellular communication network and mapping data, whether the cellular communication network supports the SA mode of the first cellular communication.

According to various embodiments of the disclosure, the mapping data may be data in which identification information of a cellular communication network and information indicating whether the cellular communication network supports an SA mode of first cellular communication are mapped. The mapping data may be generated at the time of manufacturing of the electronic device 600 and stored in the memory 610, and may be updated by the cellular communication network.

According to various embodiments of the disclosure, the mapping data may further include information related to the cellular communication network. For example, the mapping data may further include information indicating whether the cellular communication network supports a specific service using the first cellular communication. For example, the specific service may include VoNR using the first cellular communication.

According to various embodiments of the disclosure, when it is determined that the cellular communication network does not support the SA mode of the first cellular communication (operation 740-N), the electronic device 600 may perform node searching through the second cellular communication in operation 750.

In a state of searching for the nodes 511, 513, and 521 through the first cellular communication, when it is determined that the SA mode of the first cellular communication is not supported, the electronic device 600 may stop an operation of searching for the nodes 511, 513, and 521 through the first cellular communication and perform an operation of searching for the nodes 511, 513, and 521 through the second cellular communication.

In a state of searching for the nodes 511, 513, and 521 through the second cellular communication, when it is determined that the SA mode of the first cellular communication is not supported, the electronic device 600 may perform an operation of searching for the nodes 511, 513, and 521 through the second cellular communication without performing an operation of searching for the nodes 511, 513, and 521 through the first cellular communication.

According to various embodiments of the disclosure, when it is determined that the cellular communication network supports the SA mode of the first cellular communication (operation 740-Y), the electronic device 600 may perform node searching through the first cellular communication in operation 760.

In a state in which the electronic device 600 performs node searching through the first cellular communication, when it is determined that the SA mode of the first cellular communication is supported, the electronic device 600 may maintain an operation of searching for the node 513 through the first cellular communication.

In a state in which the electronic device 600 performs node searching through the second cellular communication, when it is determined that the SA mode of the first cellular communication is supported, the electronic device 600 may stop an operation of searching for the nodes 511 and 521 through the second cellular communication and search for the node 513 through the first cellular communication.

Figure 8:
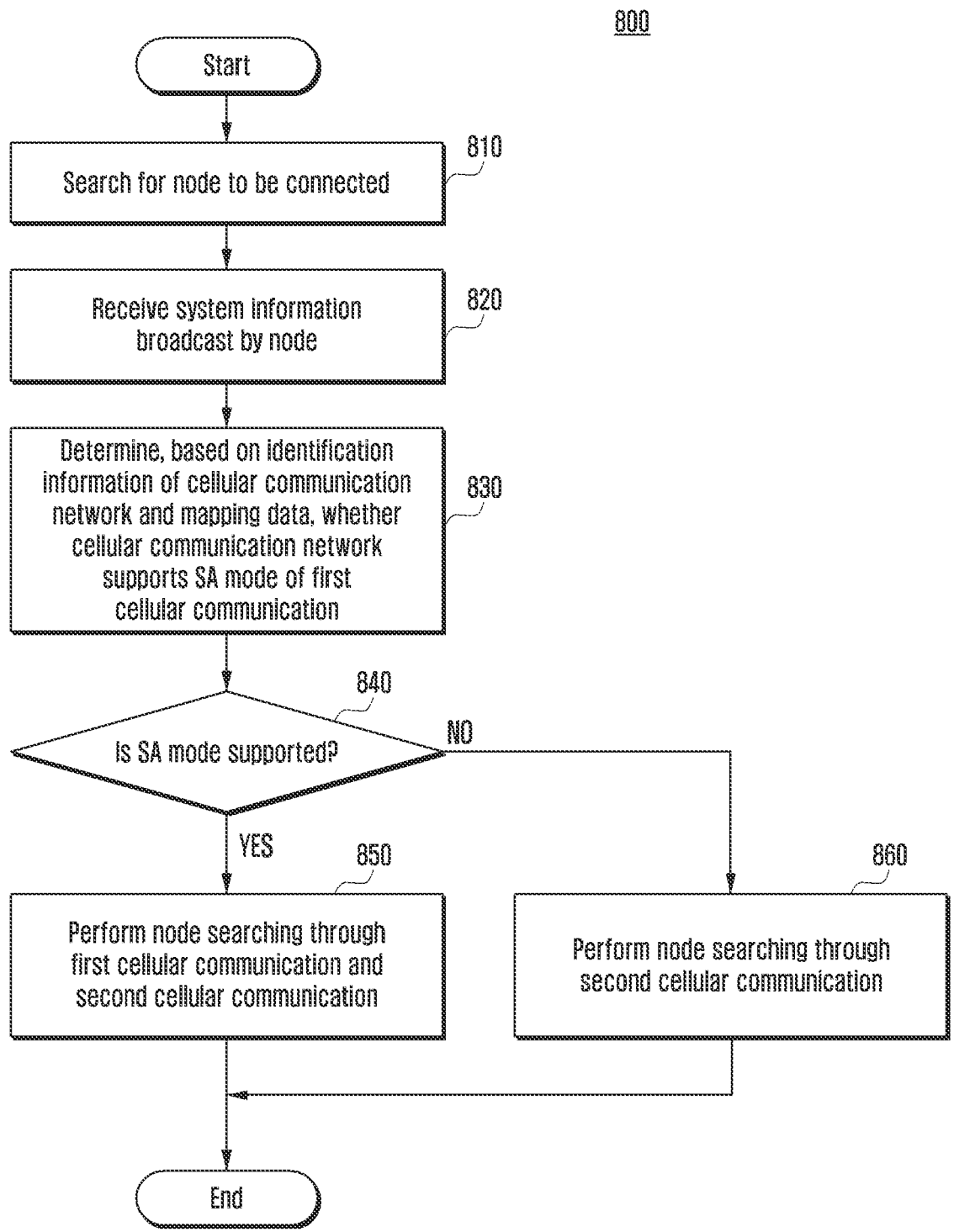
FIG. 8 is another operation flowchart illustrating an operation method of an electronic device according to an embodiment of the disclosure.

FIG. 8 is another operation flowchart illustrating an operation method of an electronic device according to an embodiment of the disclosure.

Referring to FIG. 8, according to various embodiments of the disclosure, in operation 810 of flowchart 800, an electronic device (e.g., the electronic device 600 in FIG. 6) may search for a node (e.g., the node 513 configured to support first cellular communication in FIG. 5A or the nodes 511 and 521 configured to support second cellular communication in FIGS. 5A and 5B) to which the same is to be connected.

According to various embodiments of the disclosure, the electronic device 600 may be implemented so as to search for the nodes 511, 513, and 521 by simultaneously using first cellular communication and second cellular communication.

The electronic device 600 may search for a node through a frequency band corresponding to the first cellular communication. In this case, the electronic device 600 may search for the node 513 configured to support the first cellular communication.

According to various embodiments of the disclosure, the electronic device 600 may search for a node through a frequency band corresponding to the second cellular communication. In this case, the electronic device 600 may search for the nodes 511 and 521 configured to support the second cellular communication.

According to various embodiments of the disclosure, in operation 820, the electronic device 600 may receive system information broadcast by the nodes 511, 513, and 521.

According to various embodiments of the disclosure, the electronic device 600 may determine identification information of a cellular communication network, included in the system information received from the found nodes 511, 513, and 521. The identification information of the cellular communication network may include PLMN information which is implemented as an MCC or a combination of an MCC and an MNC. According to various embodiments of the disclosure, in operation 830, the electronic device 600 may determine, based on the identification information of the cellular communication network and mapping data, whether the cellular communication network supports an SA mode of the first cellular communication.

According to various embodiments of the disclosure, the mapping data may be data in which identification information of a cellular communication network and information indicating whether the cellular communication network supports an SA mode of first cellular communication are mapped. The mapping data may be generated at the time of manufacturing of the electronic device 600 and stored in the memory 610, and may be updated by the cellular communication network.

According to various embodiments of the disclosure, the mapping data may further include information related to the cellular communication network. For example, the mapping data may further include information indicating whether the cellular communication network supports a specific service using the first cellular communication. For example, the specific service may include VoNR using the first cellular communication.

According to various embodiments of the disclosure, while searching in parallel for the node 513 configured to support the first cellular communication and the nodes 511 and 521 configured to support the second cellular communication, the electronic device 600 may determine whether the SA mode of the first cellular communication is supported, based on the mapping data and system information, which is first received, among system information broadcast by the node 513 configured to support the first cellular communication and system information broadcast by the nodes 511 and 521 configured to support the second cellular communication.

According to various embodiments of the disclosure, when it is determined that the cellular communication network supports the SA mode of the first cellular communication (operation 840-Y), the electronic device 600 may perform node searching through the first cellular communication and the second cellular communication in operation 850.

According to various embodiments of the disclosure, when it is determined that the cellular communication network does not support the SA mode of the first cellular communication (operation 840-N), the electronic device 600 may perform node searching through the second cellular communication in operation 860.

In a state in which the electronic device 600 performs node searching through the first cellular communication and the second cellular communication, when it is determined that the SA mode of the first cellular communication is not supported, the electronic device 600 stops performing node searching through the first cellular communication, and may perform node searching through the second cellular communication.

According to various embodiments of the disclosure, the electronic device 600, which supports node searching using both the first cellular communication and the second cellular communication, may determine, based on mapping data and system information received from a founded node, whether the SA mode of the first cellular communication is supported. When it is determined that the SA mode of the first cellular communication is not supported, the electronic device 600 may stop a node searching operation using the first cellular communication. Through the above-described method, the electronic device 600 according to various embodiments of the disclosure can reduce power consumption caused by to the node searching operation using the first cellular communication.

Figure 9:
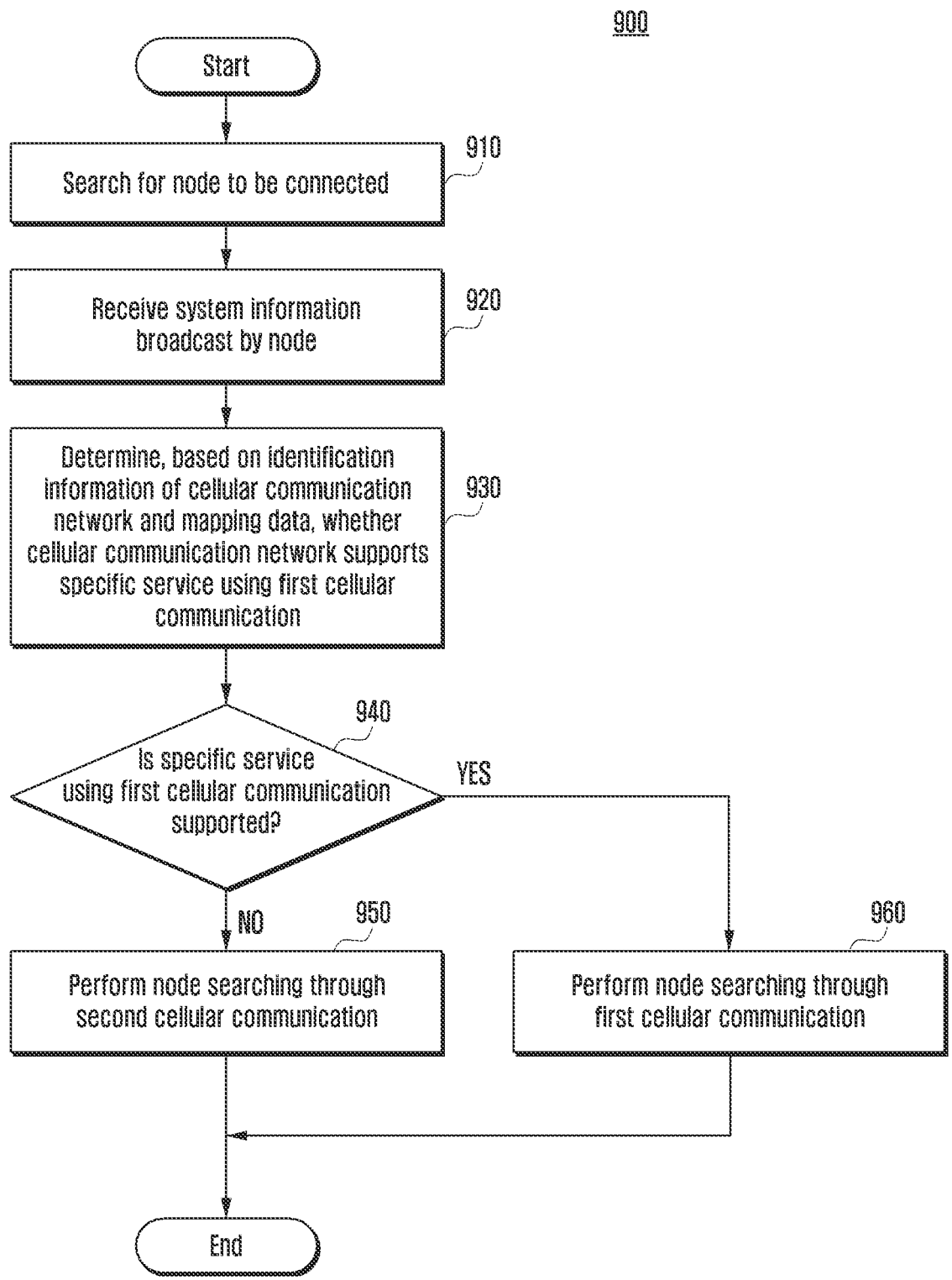
FIG. 9 is another operation flowchart illustrating an operation method of an electronic device according to an embodiment of the disclosure.

FIG. 9 is another operation flowchart illustrating an operation method of an electronic device according to an embodiment of the disclosure.

Referring to FIG. 9, according to various embodiments of the disclosure, in operation 910 of flowchart 900, an electronic device (e.g., the electronic device 600 in FIG. 6) may search for a node (e.g., the node 513 configured to support first cellular communication in FIG. 5A or the nodes 511 and 521 configured to support second cellular communication in FIGS. 5A and 5B) to which the same is to be connected.

According to various embodiments of the disclosure, the electronic device 600 may be implemented such that the same can search for the nodes 511, 513, and 521 by simultaneously using first cellular communication and second cellular communication.

The electronic device 600 may search for a node through a frequency band corresponding to the first cellular communication. In this case, the electronic device 600 may search for the node 513 configured to support the first cellular communication.

According to various embodiments of the disclosure, the electronic device 600 may search for a node through a frequency band corresponding to the second cellular communication. In this case, the electronic device 600 may search for the nodes 511 and 521 configured to support the second cellular communication.

According to various embodiments of the disclosure, in operation 920, the electronic device 600 may receive system information broadcast by the nodes 511, 513, and 521.

According to various embodiments of the disclosure, the electronic device 600 may determine identification information of a cellular communication network, included in the system information received from the found nodes 511, 513, and 521. The identification information of the cellular communication network may include PLMN information which is implemented as an MCC or a combination of an MCC and an MNC.

According to various embodiments of the disclosure, in operation 930, the electronic device 600 may determine, based on the identification information of the cellular communication network and mapping data, whether the cellular communication network supports a specific service using the first cellular communication.

According to various embodiments of the disclosure, the mapping data may be data in which identification information of a cellular communication network and information indicating whether the cellular communication network supports an SA mode of first cellular communication are mapped. The mapping data may be generated at the time of manufacturing of the electronic device 600 and stored in the memory 610, and may be updated by the cellular communication network.

According to various embodiments of the disclosure, the mapping data may further include information related to the cellular communication network. For example, the mapping data may further include information indicating whether the cellular communication network supports the specific service using the first cellular communication. For example, the specific service may include VoNR using the first cellular communication.

According to various embodiments of the disclosure, when it is determined that the cellular communication network does not support the specific service using the first cellular communication (operation 940-N), the electronic device 600 may perform node searching through the second cellular communication in operation 950.

When it is determined that the cellular communication network does not support the specific service using the first cellular communication, the electronic device 600 may stop or may not perform an operation of searching for the node 513 through the first cellular communication.

According to various embodiments of the disclosure, when it is determined that the cellular communication network supports the specific service using the first cellular communication (operation 940-Y), the electronic device 600 may perform node searching through the first cellular communication in operation 960.

When it is determined that the cellular communication network supports the specific service, the electronic device 600 may maintain or perform an operation of searching for the node 513 through the first cellular communication.

An electronic device according to various embodiments of the disclosure may include a communication circuit, a memory configured to store mapping data in which identification information of a cellular communication network and information indicating whether the cellular communication network supports an SA mode of a first cellular communication supported thereby are mapped, and a communication processor, wherein the communication processor is configured to while searching for a node through the first cellular communication and/or second cellular communication, receive system information broadcast by the node, determine, based on identification information of a cellular communication network included in the system information and the mapping data, whether a cellular communication network corresponding to the node supports the SA mode of the first cellular communication, and, when it is determined that the cellular communication network does not support the SA mode of the first cellular communication, stop searching for the node through the first cellular communication and search for the node through the second cellular communication.

In the electronic device according to various embodiments of the disclosure, the communication processor may be configured to perform or maintain searching for a node through the first cellular communication when it is determined that the cellular communication network supports the SA mode of the first cellular communication.

In the electronic device according to various embodiments of the disclosure, the communication processor may be configured to search for the node through the first cellular communication before searching for the node through the second cellular communication.

In the electronic device according to various embodiments of the disclosure, the communication processor may be configured to, when it is determined, while searching for the node through the second cellular communication, that the SA mode of the first cellular communication is supported, stop searching for the node through the second cellular communication and search for the node through the first cellular communication.

In the electronic device according to various embodiments of the disclosure, the communication processor may be configured to maintain simultaneously searching for the node through the first cellular communication and the second cellular communication when node searching is capable of being simultaneously performed through the first cellular communication and the second cellular communication and when it is determined that the cellular communication network supports the SA mode of the first cellular communication.

In the electronic device according to various embodiments of the disclosure, the communication processor may be configured to, when it is determined that the cellular communication network does not support the SA mode of the first cellular communication, stop searching for the node through the first cellular communication and search for the node through the second cellular communication.

In the electronic device according to various embodiments of the disclosure, the communication processor may be configured to receive system information broadcast by a found node while searching for the node through the first cellular communication, determine, based on the system information, whether the cellular communication network supports the SA mode of the first cellular communication, and update the mapping data, based on whether the SA mode of the first cellular communication is supported.

In the electronic device according to various embodiments of the disclosure, the communication processor may be configured to receive system information broadcast by a found node while searching for the node through the second cellular communication before searching for the node through the first cellular communication, and, when it is determined, based on the system information, that there is a node adjacent to the found node and configured to support the first cellular communication, search for the node, which is configured to support the first cellular communication, through the first cellular communication.

In the electronic device according to various embodiments of the disclosure, the mapping data may include data in which the identification information of the cellular communication network and information indicating whether a specific service using the first cellular communication is supported are mapped, and the communication processor may be configured to search for the node through the second cellular communication when it is determined, based on the mapping data, that the cellular communication network does not support the specific service.

In the electronic device according to various embodiments of the disclosure, the specific service may include VoNR.

An operation method of an electronic device according to various embodiments of the disclosure may include receiving, while searching for a node of a cellular communication network, system information broadcast by the node, determining whether a cellular communication network corresponding to the node supports the first cellular communication, based on mapping data in which identification information of the cellular communication network and information indicating whether the cellular communication network supports an SA mode of a first cellular communication supported thereby are mapped and identification information of a cellular communication network included in the system information, and, when it is determined that the cellular communication network does not support the SA mode of the first cellular communication, stopping searching for the node through the first cellular communication, and searching for the node through second cellular communication.

The operation method of the electronic device according to various embodiments of the disclosure may further include performing or maintaining searching for the node through the first cellular communication when it is determined that the cellular communication network supports the SA mode of the first cellular communication.

In the operation method of the electronic device according to various embodiments of the disclosure, searching for the node through the first cellular communication may be performed before searching for the node through the second cellular communication.

The operation method of the electronic device according to various embodiments of the disclosure may further include, when it is determined, while searching for the node through the second cellular communication, that the SA mode of the first cellular communication is supported, stopping searching for the node through the second cellular communication, and searching for the node through the first cellular communication.

The operation method of the electronic device according to various embodiments of the disclosure may further include maintaining simultaneously searching for the node through the first cellular communication and the second cellular communication when the electronic device is capable of simultaneously performing node searching through the first cellular communication and the second cellular communication and when it is determined that the cellular communication network supports the SA mode of the first cellular communication.

The operation method of the electronic device according to various embodiments of the disclosure may further include, when it is determined that the cellular communication network does not support the SA mode of the first cellular communication, stopping searching for the node through the first cellular communication, and searching for the node through the second cellular communication.

The operation method of the electronic device according to various embodiments of the disclosure may further include receiving system information broadcast by a found node while searching for the node through the first cellular communication, determining, based on the system information, whether the cellular communication network supports the SA mode of the first cellular communication, and updating the mapping data, based on whether the SA mode of the first cellular communication is supported.

The operation method of the electronic device according to various embodiments of the disclosure may further include receiving system information broadcast by a found node while searching for the node through the second cellular communication before searching for the node through the first cellular communication, and, when it is determined, based on the system information, that there is a node adjacent to the found node and configured to support the first cellular communication, searching for the node, which is configured to support the first cellular communication, through the first cellular communication.

In the operation method of the electronic device according to various embodiments of the disclosure, the mapping data may include data in which the identification information of the cellular communication network and information indicating whether a specific service using the first cellular communication is supported are mapped, and the operation method of the electronic device may further include searching for the node through the second cellular communication when it is determined that the cellular communication network does not support the specific service.

In the operation method of the electronic device according to various embodiments of the disclosure, the specific service may include VoNR.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a communication circuit;
a memory configured to store mapping data in which identification information of a cellular communication network and information indicating whether the cellular communication network supports a standalone (SA) mode of a first cellular communication supported thereby are mapped; and
a communication processor,
wherein the communication processor is configured to:
while the electronic device is set to connect the first cellular communication with priority over a second cellular communication and is in a coverage of a cellular communication network not supporting the SA mode of the first cellular communication, search for a node through the first cellular communication,
while searching for the node through the first cellular communication, receive system information broadcast by the node,
determine, based on identification information of a cellular communication network included in the received system information and the mapping data, whether the cellular communication network corresponding to the node supports the SA mode of the first cellular communication,
in response to determining that the cellular communication network does not support the SA mode of the first cellular communication based on the identification information of the cellular communication network and the mapping data, stop searching for the node through the first cellular communication before the searching for the node through the first cellular communication is complete, and
search for the node through the second cellular communication.

2. The electronic device of claim 1, wherein the communication processor is further configured to perform or maintain the searching for the node through the first cellular communication if the cellular communication network supports the SA mode of the first cellular communication.

3. The electronic device of claim 1, wherein the communication processor is further configured to, when it is determined, while searching for the node through the second cellular communication, that the SA mode of the first cellular communication is supported, stop searching for the node through the second cellular communication and search for the node through the first cellular communication.

4. The electronic device of claim 1, wherein the communication processor is further configured to:
receive system information broadcast by the node while searching for the node through the first cellular communication;
determine, based on the received system information, whether the cellular communication network supports the SA mode of the first cellular communication; and
update the mapping data, based on whether the SA mode of the first cellular communication is supported.

5. The electronic device of claim 4, wherein the communication processor is further configured to:
receive system information broadcast by the node while searching for the node through the second cellular communication before searching for the node through the first cellular communication; and when it is determined, based on the received system information, that there is a node adjacent to the node and configured to support the first cellular communication, search for the node, configured to support the first cellular communication, through the first cellular communication.

6. The electronic device of claim 1,
wherein the mapping data comprises data in which the identification information of the cellular communication network and information indicating whether a specific service using the first cellular communication is supported are mapped, and
wherein the communication processor is further configured to search for the node through the second cellular communication when it is determined, based on the mapping data, that the cellular communication network does not support the specific service.

7. The electronic device of claim 6, wherein the specific service comprises voice over new radio (VoNR).

8. An operation method of an electronic device, comprising:
while the electronic device is set to connect a first cellular communication with priority over a second cellular communication and is in a coverage of a cellular communication network not supporting a standalone (SA) mode of the first cellular communication, searching for a node through the first cellular communication;
receiving, while searching for the node of the cellular communication network, system information broadcast by the node;
determining whether the cellular communication network supports the SA mode of the first cellular communication, based on mapping data in which identification information of the cellular communication network and information indicating whether the cellular communication network supports the SA mode of the first cellular communication supported and identification information of the cellular communication network included in the received system information thereby are mapped;
in response to determining that the cellular communication network does not support the SA mode of the first cellular communication based on the identification information of the cellular communication network and the mapping data, stopping searching for the node through the first cellular communication before the searching for the node through the first cellular communication is complete; and
searching for the node through a second cellular communication.

9. The operation method of claim 8, further comprising performing or maintaining the searching for the node through the first cellular communication if the cellular communication network supports the SA mode of the first cellular communication.

10. The operation method of claim 8, further comprising, when it is determined, while searching for the node through the second cellular communication, that the SA mode of the first cellular communication is supported, stopping the searching for the node through the second cellular communication and searching for the node through the first cellular communication.

11. The operation method of claim 8, further comprising:
receiving system information broadcast by the node while searching for the node through the first cellular communication;

determining, based on the received system information, whether the cellular communication network supports the SA mode of the first cellular communication; and updating the mapping data, based on whether the SA mode of the first cellular communication is supported.

12. The operation method of claim 11, further comprising:

receiving system information broadcast by the node while searching for the node through the second cellular communication before searching for the node through the first cellular communication; and when it is determined, based on the received system information, that there is a node adjacent to the node and configured to support the first cellular communication, searching for the node, configured to support the first cellular communication, through the first cellular communication.

13. The operation method of claim 8, wherein the mapping data comprises data in which the identification information of the cellular communication network and information indicating whether a specific service using the first cellular communication is supported are mapped, and wherein the operation method further comprises searching for the node through the second cellular communication when it is determined that the cellular communication network does not support the specific service.

14. The operation method of claim 13, wherein the specific service comprises voice over new radio (VoNR).

\* \* \* \* \*